March 9, 1926.

A. C. BELLO 1,575,962

SPADING APPARATUS

Filed Feb. 24 1925

INVENTOR.
Aurelio Cruz Bello
BY
B. Singer
ATTORNEY.

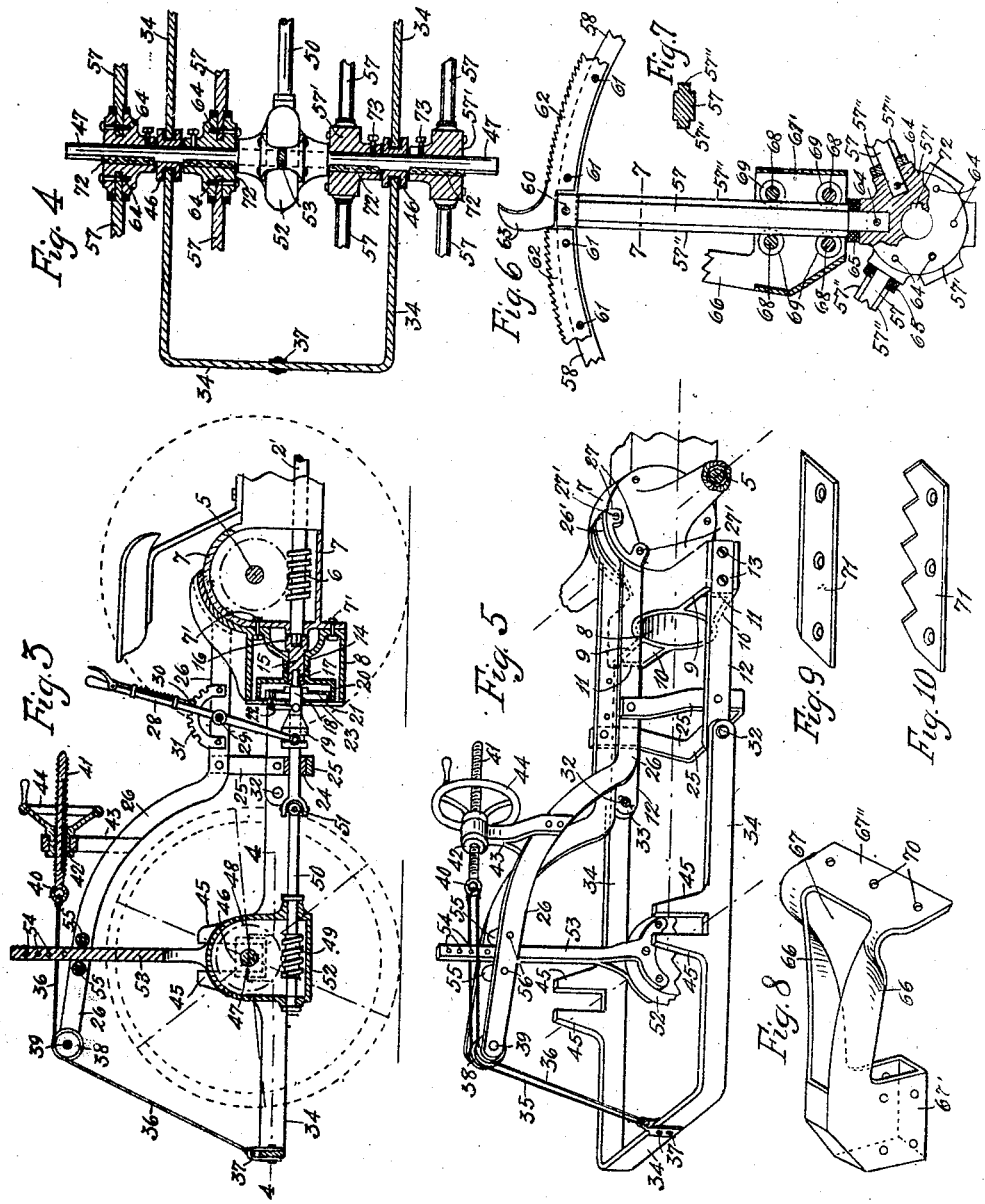
March 9, 1926.
A. C. BELLO
SPADING APPARATUS
Filed Feb. 24, 1925
1,575,962
3 Sheets-Sheet 3

Patented Mar. 9, 1926.

1,575,962

UNITED STATES PATENT OFFICE.

AURELIO CRUZ BELLO, OF SAGUA LA GRANDE, CUBA.

SPADING APPARATUS.

Application filed February 24, 1925. Serial No. 11,266.

*To all whom it may concern:*

Be it known that I, AURELIO CRUZ BELLO, a citizen of the Republic of Cuba, and resident of Sagua la Grande, Province of Santa Clara, Cuba, have invented certain new and useful Improvements in a Spading Apparatus, of which the following is a specification.

This invention relates to an apparatus for mechanically effecting the operation of spading or cutting off the grass in the cultivating fields.

An object of this invention is to provide an apparatus of this character having a plurality of spading members assembled in sets mechanically driven so that all the spading members of a series of sets may cover an area of ground which will be the area comprised between two rows of plants, thus effecting with one single man and with a relatively small expense the labor that would render necessary at least twenty men with the spading tools at present in use.

Another object of the invention is to associate to the spading members, means for cutting the straw or vegetal residues, roots, stalks and the like, which might be found on the cultivating fields.

Still a further object of the invention is to provide an apparatus of the said kind whose spading members be mounted on a frame swingingly supported so that it might yield against the striking of any obstruction on the ground.

And still a further object is to combine an apparatus of this kind with a tractor so that the driver of the latter may easily operate the spading mechanism from his seat by actuating a clutch mechanism arranged between the tractor driving shaft and the spading mechanism.

The invention is described with reference to the figures of the annexed drawings, in which:

Fig. 3 is a longitudinal vertical section on line 3—3 of Fig. 2.

Fig. 4 is a horizontal section on line 4—4 of Fig. 3.

Fig. 5 is a perspective view showing the frame supporting the spading mechanism and its connection to a tractor.

Fig. 6 is a detail diametral section of a wheel carrying spading members.

Fig. 7 is a section view on line 7—7 of Fig. 6.

Fig. 8 is a detail view showing in perspective a spade or spading member.

Figure 1:
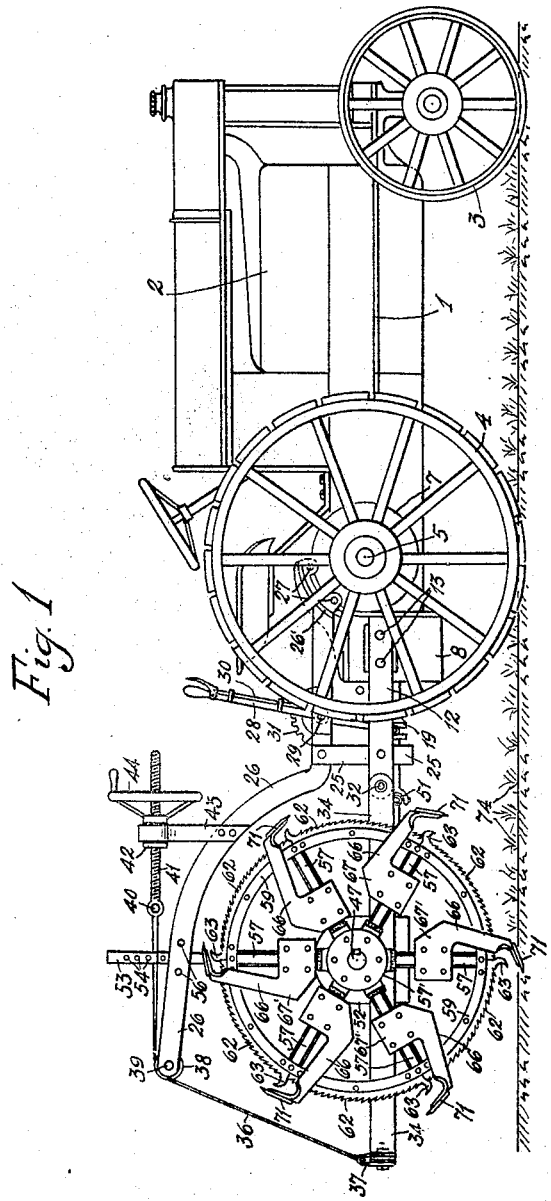
Fig. 1 is a side elevation view of the apparatus.
Figure 2:
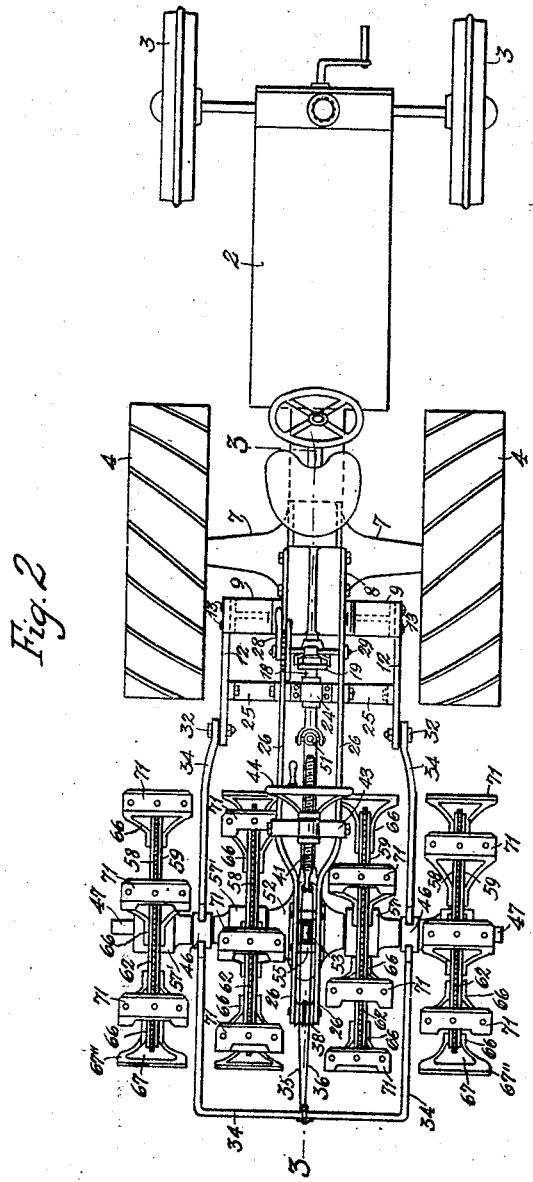
Fig. 2 is an upper plan view of the same.

And Figs. 9 and 10 are detail views showing in perspective two different forms of a blade for the spade.

In the drawings, 1 indicates the frame of a tractor of the Fordson type on which is mounted the engine 2 and which frame is carried on front steering wheels 3 and rear driving wheels 4, the shaft 5 of the latter being operated from the driving shaft 2' through a worm gear 6 protected by the usual casing 7.

This casing 7 has secured thereto by means of bolts 7' a cylindrical case 8 forming a rear extension to case 7 and which is provided with horizontal side wings, an upper one 9 and a lower one 10 connected at their end by a vertical web 11 forming a channel for receiving at each side a longitudinal member 12 fixed to web 11 by bolt screws 13. Said case 8 forms inside a bearing 14 for the sectional counter-shaft 15 having at one end a square socket 16 for securely coupling into it the square end of driving shaft 2' and on the other end said shaft 15 has a cylindrical socket 17 for loosely coupling with the cylindrical end of another sectional counter-shaft 18 on which slides a collar 19 forming part of a friction clutching mechanism whose operative parts are an outer drum 20 fixed to the counter-shaft 15 and a plurality of friction segments 21 which actuate through their expansion and which are mounted on the outer end of small bell-crank levers 22 each having its fulcrum point on a plate 23 fixed on the edge of cylindrical case 8 and through slots of which plate passes one of the arms of said small bell-crank levers 22, the other end of the latter being pivotally connected to collar 19, the counter-shaft 18 being supported on a bearing 24 formed on the middle point of the bottom of a brace 25 secured at its side portions to the longitudinal members 12 and to longitudinal members 26 which at their middle points are curved upward and terminate in supporting curve plates 26' which are provided with lugs having holes 27 for being fixed to the latter by means of screws 27. The clutch mechanism is actuated by means of a hand lever 28 which is fulcrumed on a transverse horizontal shaft 29 supported on the longitudinal members 26 and which lever is pivotally connected to collar 19, said lever 28 being provided with a pawl catching device 30 cooperating with a gear segment 31 fixed to one of the longitudinal members 26 for holding the lever 28 in any convenient position.

On the ends of the longitudinal members 12 are pivotally connected by horizontal pins 32 secured by means of forelocks 33, the ends of a U-shaped frame 34 which is designed for carrying the spading mechanism and is supported at its free end so that it might yield and be adjustable at its height by means of two cables or ropes 35 and 36 which at their lower ends are connected by means of staples to a bracket 37 riveted to the intermedite portion of frame 34 and said ropes or cables are guided around pulley-wheels 38 loosely mounted on a short horizontal shaft 39 mounted on the ends of the upward curved end portions of the longitudinal members 26, and at their other end said ropes or cables 35 and 36 are connected by ring to a loop 40 formed at the end of a horizontal screw 41 slidably mounted on a nut 42 which does not move slidably but rotatorily in a standard 43 secured to both longitudinal members 26, nut 42 being operated by a hand wheel 44 integral to the same. The two longitudinal portions of frame 34 have widened portions 45 provided with slots forming guides for vertically sliding bearings 46 in which is rotatorily mounted a transverse horizontal shaft 47 having fixed at its middle point a vertical gear wheel 48 for meshing with a worm gear 49 fixed on a longitudinal horizontal shaft 50 which is in alinement with the counter-shaft 18 and connected to the latter by a universal joint 51, the shaft 50 being supported by a casing 52 inclosing also the worm wheel 48. On this casing 52 is fixed by a strappled base a vertical guiding rod 53 whose upper end is provided with a plurality of holes 54 spaced apart and said rod 53 engages two horizontal rollers 55 loosely mounted on pins 56 arranged across longitudinal members 26, said holes 54 being for fixing therethrough a pin acting as a butt for bar 53 against the longitudinal members 26. On horizontal shaft 47 are fixed all along the same a plurality of wiper wheels 57, there being illustrated four of them in the drawings, two inside of frame 34 and two outside of the same. The peripheral portion of each wiper wheel 57 consists of two rings 58 and 59 arranged at one and the other side of the end heads of spokes 57 and connected to each one of the latter by means of a riveted pin 60 and between each two adjacent spokes 57 is connected to rings 58 and 59 and fixed between the same by rivets 61 a saw blade segment 62 projecting at its outer end from the rings 58 and 59, and terminating at its end over the head of an adjacent spoke 57 with a sharp edge knife 63 of pawl shape and leading radially outwards. Each spoke 57 has its inner end reduced section inserted in a socket formed in the hub 57' of the wheel and fixed therein by a bolt screw 64, and the intermediate portion of each spoke 57 between hub 57' and the peripheral rings 58 and 59 has a transverse section forming a rib 57'' at each side, each spoke 57 having a rubber collar 65 resting on a seat formed respectively on the hub 57' at the insertion point of each spoke 57. On each spoke 57 is slidably mounted a spade which comprises a spade support 66 which is of the shape of the hand spades now in use, which has at its middle portion a large gap 67 through which mounts around the peripheral portion of the wheel and terminates at its inner end in a supporting casing 67' opened at its ends and laterally closed, which braces the spoke 57 and has loosely mounted on pins 68 horizontally fixed through the sides of said casing 67' two pairs of rollers 69, provided with an annular channel through which engage ribs 57'' of each spoke 57, which thus acts as a guide to each spade along its sliding movement on its respective spoke 57, the rubber collar 65 acting as a cushion for the supporting casing 67' of the spade, the plan sheet 67'' forming the free end of support 66 being provided with a plurality of holes 70 for the passage of bolts securing the cutting blade 71 of the spade, which blade can be of straight sharp edge as shown in Fig. 9 or of serrated sharp edge as shown in Fig. 10. Shaft 47 has a plurality of wedge grooves 72 so that each two adjacent wheels 57 may be so secured in position on shaft 47, that the spokes 57 and accordingly the spades 66 may be in radial alternative position with the aim in view that all the spades of the spading mechanism may cover the largest possible closed area of the ground, each hub 67' being longitudinally fixed on shaft 47 by a set screw 73.

The operation of this apparatus is as follows: Once the height at which the blades 71 of the spades are to work, is regulated, which regulation is effected by properly actuating the sliding screw 41 by means of the hand wheel 44, the clutch mechanism coupling the counter-shaft 18 and driving shaft 2' is actuated by means of the hand lever 28, whereby the rotation of this shaft 2' is transmitted to shaft 47 and thereby rotate at the same time all the wiper wheels 57, through which movement, in the upper half of a revolution the spades 66 tend to fall towards the center of the wheel by gravity while in the lower half of each revolution the spades 66 tend to come away from 57', the blades 71 cutting the grass 74 on the ground in view of its tangential force, at the same time that the circular saw blade 62 together with the projecting pawl-shaped knives 63 serve to respectively cut the straw and the hard vegetal residues, such as roots, stalks, etc., that might be on the ground.

As the spades 66 are slidable on their supporting spokes 57, when they strike against any obstruction on the ground, it will easily yield, in which yielding it will be aided, if it is necessary, by the upward sliding movement of bearing 46 of shaft 47 inside its supporting guides 45, in case the obstruction be large enough to strike up the whole of the wiper wheels 57 with its carrying shaft 47.

Instead of using a tractor for driving the apparatus, animal power can be used.

It should be observed that the details of construction of the spading mechanism and of the arrangement of same can be varied without altering the essential features of the invention, which is as claimed in the appended claims.

What I claim is:—

1. A spading apparatus, comprising a transverse shaft, wiper wheels fixed on said shaft one at the side of the other, a circular saw blade fixed at the periphery of each wheel, and grass cutting members slidably mounted respectively on the spokes of said wheels so that the cutting blades of these grass cutting members be out of the saw blade.

2. A spading apparatus comprising a transverse shaft, wiper wheels fixed on said shaft one at the side of the other, circular saw blade segments fixed on the periphery of each wheel and alternative with projecting radial knives, and grass cutting members slidably mounted respectively on the spokes of said wheels so that the cutting blades of these grass cutting members be in transverse position with respect to the plan of its respective wheel and out of the projecting radial knives.

3. A spading apparatus, comprising a transverse shaft, wiper wheels fixed on said shaft, one at the side of the other, and grass cutting means slidably mounted by means of friction rollers on the spokes of said wheels and so that the cutting blades of these grass cutting means be in transverse position with respect to the plan of its respective wheel and out of the peripheral portion of the same.

In witness whereof I affix my signature.

AURELIO CRUZ BELLO.